United States Patent [19]

Rey et al.

[11] 3,801,306

[45] Apr. 2, 1974

[54] METHOD FOR THE RECOVERY OF NICKEL FROM MIXED ORES

[75] Inventors: Maurice Rey; Victor Formanek, both of Paris, France

[73] Assignees: "Le Nickel"; Societe Miniere Et Metallurgioue De Penarroya, both of Paris, France; part interest to each

[22] Filed: Sept. 27, 1971

[21] Appl. No.: 184,242

[30] Foreign Application Priority Data
Sept. 28, 1970  France .............................. 70.34961

[52] U.S. Cl. .................................................. 75/82
[51] Int. Cl. ............................................ C22b 23/02
[58] Field of Search ....................... 75/82, 111, 113

[56] References Cited
UNITED STATES PATENTS

| | | | |
|---|---|---|---|
| 3,453,101 | 7/1969 | Takahashi et al ................. | 75/111 X |
| 2,400,461 | 5/1946 | Hills ..................................... | 74/82 X |
| 3,656,935 | 4/1972 | Iwasaki .................................. | 75/82 |
| 3,323,900 | 6/1967 | Takahashi et al ......................... | 75/2 |
| 1,480,212 | 1/1924 | Lamothe .................................. | 75/82 |
| 1,487,145 | 3/1924 | Caron .................................. | 75/82 X |
| 2,573,153 | 10/1951 | Lichty .................................. | 75/82 X |
| 2,400,098 | 5/1946 | Brogdon .................................. | 75/82 |

OTHER PUBLICATIONS

Dana's Manual of Mineralogy; 16th Ed.; John Wiley & Sons; New York; 1952; pages 351–353.

*Primary Examiner*—L. Dewayne Rutledge
*Assistant Examiner*—M. J. Andrews
*Attorney, Agent, or Firm*—Fleit, Gipple & Jacobson

[57] ABSTRACT

Method for improving the recovery of nickel by magnetic separation of the product resulting from the treatment of a nickeliferous initial material by a segregation process, characterized in that the nickeliferous initial material is obtained by mixing laterite and a second type of ore in which the acid value, i.e., the ratio of the oxygen content of the silica contained in the ore to the oxygen content of the basic components of said ore, is greater than one.

2 Claims, No Drawings

METHOD FOR THE RECOVERY OF NICKEL FROM MIXED ORES

BACKGROUND OF THE INVENTION

The present invention relates to the recovery of nickel from oxide ores by the segregation process. It is well-known that this segregation process in general consists in reacting at a temperature between 900° and 1,000° C a finely comminuted mixture comprising nickeliferous ore, carbon and a chloridizing agent which is generally an alkali chloride, an alkaline earth chloride or a mixture of such chlorides.

Furthermore, the Applicants have shown in their co-pending U.S. Patent application Ser. No. 79,711 filed Oct. 9, 1970 for "Ore Segregation Process," now abandoned, that these chlorides can be replaced by hydrochloric gas, by chlorine or by a gaseous mixture containing one or both of these gases.

Whatever chloridizing agent is used, the chemical reactions which occur during the segregation lead to the volatilization of nickel in the form of nickel chloride and to its precipitation as metal on the carbon particles. The metal which was disseminated in the oxides and silicates of the ore gangue segregates as discrete particles with a high nickel content which are then recovered by magnetic separation or by flotation to give a concentrate with a high metal percentage provided the operating conditions are appropriately chosen in which event the extraction of nickel can reach 80 to 90 percent, the remainder being essentially iron.

However, experiences have shown that one of the main types of nickel oxide ores, namely, laterite, the composition of which will be given below, is not very adapted to the magnetic separation which follows the segregation itself. But this magnetic separation method is preferred as it is economically much more advantageous than the flotation method and, furthermore, use of the magnetic separation method produces richer nickel concentrates and tailings which are poorer in nickel.

The superiority of the magnetic separation is further demonstrated by the fact that whenever the flotation is used, it is recommended to treat the concentrate by magnetic separation to enrich it. Often even the tailings are subjected to a magnetic treatment to recover nickel and to make it poorer.

Accordingly, a serious problem of the art and one of great interest is to find a way to make laterite suitable to magnetic separation following a normal segregation treatment.

One of the objects of the present invention is thus to provide a process for the segregation treatment of laterite which allows an excellent subsequent magnetic separation.

Another object of this invention is the provision of a process of this type which leads to a high nickel percentage in the concentrate and to a low percentage of this metal in the tailings resulting from a magnetic concentration treatment.

A further object of this invention is to provide a method of the type described hereinabove which lowers the concomitant extraction of the iron contained in the ore, during magnetic separation.

BRIEF SUMMARY OF THE INVENTION

These and other objects are accomplished according to the process of this invention by adding to laterite another type of nickel oxide ore like garnierite the composition of which will be given below, and subjecting to segregation and magnetic separation processes whereby the nickel content of the concentrate obtained by magnetic separation is surprisingly higher than when using, either laterite alone, or garnierite alone as the starting ore.

More generally, this surprising result is obtained, according to the invention by adding to laterite an ore with an acid index greater than one.

Preferably, such ore with an acidic reaction represents at least 50 weight percent of the initial mixture and, advantageously and more preferably, about 75 weight percent of this mixture.

DETAILED DESCRIPTION

First, one must bear in mind that the acid index of an ore is the ratio of the oxygen content of the silica contained in the ore to the oxygen content of the basic components of said ore. The latter comprise essentially, in the case of nickel oxide ore, magnesia and ferrous oxide. The determination of this ratio for a given ore is easily arrived at by those skilled in the art.

The Table I below gives the chemical analysis of several laterites and garnierites weight percent and shows the acid index for each of these ores. One notices that this index is always smaller than one for the laterites and greater than one for the garnierites.

TABLE I

Analysis of several laterites and garnierties (*)

A – Laterites

| N° | Ni | SiO$_2$ | MgO | Fe | PF | I$_1$ | I$_2$ |
|---|---|---|---|---|---|---|---|
| 1 | 1,17 | 5,90 | 2,47 | 44,0 | – | – | 0,23 |
| 2 | 1,28 | 5,80 | 0,93 | 43,4 | – | – | 0,24 |
| 3 | 1,30 | 5,76 | 1,63 | 43,8 | – | – | 0,23 |
| 4 | 1,33 | 2,52 | 0,30 | 47,8 | – | – | 0,10 |
| 5 | 1,14 | 2,00 | 0,15 | 48,8 | 12,3 | – | 0,07 |

PF = Loss on ignition.

B – Garnierites

| N° | Ni | SiO$_2$ | MgO | Fe | PF | I$_1$ | I$_2$ |
|---|---|---|---|---|---|---|---|
| 1 | 1,70 | 49,68 | 22,99 | 9,19 | 10,71 | 2,88 | 2,22 |
| 2 | 1,54 | 58,35 | 31,28 | 9,65 | 11,80 | 2,49 | 2,02 |
| 3 | 2,80 | 36,44 | 21,68 | 17,45 | 9,76 | 2,25 | 1,40 |
| 4 | 1,79 | 42,97 | 28,40 | 10,22 | 9,37 | 2,02 | 1,59 |
| 5 | 1,63 | 40,06 | 34,48 | 5,42 | 15,39 | 1,56 | 1,38 |

(*) The ratio I$_1$ (Oxygen of the silica/oxygen of the basic components) takes in account only the magnesia. The ratio I$_2$ takes also in account the ferrous oxide. The lime and the alumina, the contents of which are very low, have been neglected.

For the laterites, only the ratio $I_2$ has been calculated, as being the only significant one.

The invention is based on the discovery that the addition to laterite of an ore with an acidic reaction improves markedly its behaviour during the magnetic separation subsequent to the segregation. A possible explanation of this phenomenon will be given below, but the Applicants do not wish to be limited by a particular theory.

It is belived that during the segregation, the iron present in the ore is reduced to the state of magnetite $Fe_3O_4$, then progressively to the state of ferrous oxide $FeO$. The intermediary magnetite is belived to be an obstacle to a satisfactory magnetic separation, because it is ferromagnetic.

Thus, the addition of an ore with an acidic reaction like garnierite would appear to facilitate the decomposition of this magnetite yielding a ferrous silicate and would appear to modify the conditions of the reduction during the segregation while making instable the magnetite which is formed.

Whatever the reasons which one could imagine to cause or lead to this surprising effect the plain fact is that it happens. In order that the invention may be well understood, an example will now be given to show, though by way of illustration only, the process herein described.

EXAMPLE

Various mixtures of laterite and garnierite were treated by the known segregation process at a temperature of 980° C during 1 hour.

All these mixtures were subjected to a precalcination the duration of which was 15 minutes for several mixtures which are designated by "Samples A" in Table II below, and 1 hour for other mixtures designated by "Samples B" in the same table.

For the segregation, the carbonaceous agent was coke added before the precalcination (2.5 weight percent) and the chloridizing agent was anhydrous calcium chloride added before the segregation (6 weight percent).

Table II gives the weight percentage of nickel and iron which were extracted during the magnetic separation subsequent to the segregation treatment described above. It also indicates the composition of the concentrates and tailings obtained.

One notices that the addition of garnierite according to the invention leads, after the extraction, to a Ni/Fe ratio, which is much higher than the ratio observed, either in the case of laterite alone, or in the case of garnierite alone.

The best results were obtained when the proportion of garnierite in the starting mixture was higher than 50 weight percent, and especially when this proportion was about 75 weight percent.

TABLE II

MIXTURES OF GARNIERITE AND LATERITE ORES RESULTS OF THE SEGREGATION (60 min. at 980°C)

| Wt % Garnierite in the Mixture | Starting Mixture Ni% | Starting Mixture Fe% | Concentrate Ni% | Concentrate Fe% | Tailings Ni% | Extraction Ni% | Extraction Fe% | Extraction Ni/Fe |
|---|---|---|---|---|---|---|---|---|
| SAMPLES A – (1) | | | | | | | | |
| 0 | 1,55 | 53,4 | 1,6 | 61,7 | 0,55 | 97,5 | 89,3 | 1,09 |
| 25 | 1,94 | 40,7 | 4,6 | 39,1 | 0,60 | 79,3 | 38,4 | 2,06 |
| 50 | 2,57 | 38,3 | 32,4 | 38,0 | 0,49 | 82,2 | 6,4 | 12,85 |
| 75 | 2,96 | 27,8 | 55,3 | 31,6 | 0,61 | 80,3 | 5,0 | 16,05 |
| 100 | 3,04 | 16,3 | 50,0 | 28,0 | 0,45 | 85,9 | 9,0 | 9,54 |
| SAMPLES B – (2) | | | | | | | | |
| 0 | 1,31 | 63,1 | 1,5 | 68,5 | 1,06 | 61,6 | 57,2 | 1,08* |
| 50 | 2,27 | 38,4 | 16,3 | 45,9 | 1,59 | 33,3 | 5,5 | 6,05 |
| 75 | 2,57 | 27,6 | 58,6 | 15,6 | 0,72 | 72,8 | 1,8 | 40,4 |
| 100 | 2,88 | 16,6 | 44,6 | 31,0 | 0,82 | 72,9 | 8,8 | 8,25 |

(1) – Precalcination 15 minutes at 1.000° C.
(2) – Precalcination 60 minutes at 1.000° C.

What we claim is:

1. In a method for improving the recovery of nickel from laterite in which
   a. the laterite is subjected to a segregation process including heating a finally comminuted mixture of the laterite together with carbon and a chloridizing agent to about 900 to 1,000° C in order to produce a volitization of the nickel in the form of nickel chloride and thereafter the precipitation of the nickel on the carbon and
   b. the segregation product so produced is subjected to magnetic separation to recover a concentrate with a high content of nickel,
   the improvement comprising admixing with said laterite at least about 50 percent by weight of garnierite.

2. The process of claim 1 wherein about 75 percent by weight of garnierite is admixed with said laterite.

* * * * *